United States Patent
Takada et al.

(10) Patent No.: US 6,214,900 B1
(45) Date of Patent: Apr. 10, 2001

(54) UV CURABLE COMPOSITION AND PRODUCT USING THE SAME

(75) Inventors: Naoto Takada; Hiroyuki Fujihara, both of Tokyo (JP)

(73) Assignee: Teikoku Printing Inks Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/157,099

(22) Filed: Sep. 18, 1998

(30) Foreign Application Priority Data

Mar. 3, 1998 (JP) .................................................. 10-067865

(51) Int. Cl.$^7$ ................................ C08F 2/48; B05D 5/10
(52) U.S. Cl. ......................... 522/96; 522/120; 522/121; 522/182; 427/516; 427/208.4; 427/207.1; 427/508
(58) Field of Search .............................. 522/182, 96, 121, 522/120; 427/516, 517, 207.1, 208.4

(56) References Cited

U.S. PATENT DOCUMENTS

| | | | |
|---|---|---|---|
| 4,286,008 | * 8/1981 | Reed et al. | 428/195 |
| 4,326,005 | * 4/1982 | Reed et al. | 428/201 |
| 4,337,289 | * 6/1982 | Reed et al. | 428/195 |
| 4,973,611 | * 11/1990 | Puder | 522/42 |
| 5,093,386 | * 3/1992 | Bishop et al. | 522/96 |
| 5,565,001 | * 10/1996 | Follett et al. | 51/297 |
| 5,580,647 | * 12/1996 | Larson et al. | 428/245 |
| 5,851,598 | * 12/1998 | Gallant | 427/515 |

FOREIGN PATENT DOCUMENTS

| | | | |
|---|---|---|---|
| 11-60658 | * 3/1999 | (JP) | . |
| 96/11217 | * 4/1996 | (WO) | . |

OTHER PUBLICATIONS

Liquid radiation curable urethane acrylate oligomer compositions and coating compositions using them for optical fibers. Chemical Abstracts. vol. 130 No. 238934, Mar. 1999.*

* cited by examiner

*Primary Examiner*—James J. Seidleck
*Assistant Examiner*—Sanza L McClendon
(74) *Attorney, Agent, or Firm*—Oblon, Spivak, McClelland, Maier & Neustadt, P.C.

(57) ABSTRACT

To provide liquid composition that allows efficient production of easy detachable adhesive solid, and adhesive products which are produced using said composition, wherein said products can be used repeating attaching and detaching and restore adhesiveness by washing when the adhesiveness was lowered.

The liquid composition is cured by exposure to UV light to give easy detachable adhesive solid. For example, liquid composition containing

| | |
|---|---|
| oligourethane diacrylate | 35.0 wt %, |
| [Compound 2] | 59.0 wt %, |

$$H_2C=CH-\underset{\underset{O}{\|}}{C}-O-(C_2H_4-O)_2-\phantom{x}\!\!\!\!\!\bigcirc\!\!\!\!\!\phantom{x}-C_6H_{13}$$

| | |
|---|---|
| acetophenone-derived photo-initiator | 5.0 wt %, and |
| additives | 1.0 wt % | is screen-printed in a film with a thickness of 15 µm on 50% area.

10 Claims, No Drawings

UV CURABLE COMPOSITION AND PRODUCT USING THE SAME

BACKGROUND OF THE INVENTION

1. Field of the Invention

The present invention relates to UV curable liquid composition for printing or coating, and adhesive and detachable products obtained by using said liquid composition.

2. Description of the Prior Art

It was difficult to detach conventional adhesive products which were applied with an adhesive agent after they were attached once and to attach again on which one wants to attach when necessary.

It took time to produce seals, labels, and stickers on which easy detachable adhesive agent was printed or coated because water-soluble easy detachable adhesive composition or solvent-soluble easy detachable adhesive composition was used and a process to evaporate water or solvent was required. In addition it was not suited to cleanse the adhesive surface of the products to use again because products on which conventional easy detachable adhesive composition was printed or coated may be damaged with kitchen detergents such as non-ionic detergents or solvents such as alcohols and benzine.

SUMMARY OF THE INVENTION

It is therefore the object of the present invention to provide a liquid composition to produce easy detachable adhesive solid efficiently.

Another object of the invention is to provide adhesive products which are produced from said liquid composition, wherein said adhesive products can be used repeatedly and adhesiveness can be restored by washing when adhesiveness has decreased.

The present invention provides liquid composition that is cured by exposure to UV light, wherein the solid that is formed by the curing has easy detachable adhesiveness.

In general the main component of the present invention is composed of monomers and oligomers which contain polymerizable double bonds. As these monomers and oligomers polymerize making cross linkages to give solids, these solids give curable paints or curable inks generally. No solid could be obtained that could solve the above-mentioned problems even if adhesive solids could be obtained.

It was, however, found that the cured material shows easy detachable adhesiveness if a specified combination of monomer and oligomer are used. Although the principle of the specified combination has not been clarified yet, it was found that the following embodiments are at least preferred.

Preferred monomers are by way of example monofunctional monomers which are expressed in the following general formula.

[Formula 1]

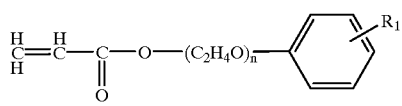

(n is 1–5, $R_1$ is a hydrocarbon group of $C_1$ to $C_{15}$)

An average value of n is preferably 1–3, $R_1$ is a hydrocarbon group of $C_6$ to $C_9$ most preferably, hydrocarbon groups are hexyl, octyl, nonyl, toluyl, and cumyl groups most preferably.

Preferred oligomers are by way of example oligourethane a crylate, most preferably oligourethane diacrylates. Preferred average molecular weight of said oligomers is of the order of 1,000–12,000, most preferably of the order of 3,000–10,000.

Preferred monomer/oligomer ratio to be used is 100/10–100/100, most preferably 100/35–100/75.

UV light is used to cure the liquid composition of the present invention. As UV light is used to cure, the liquid composition of the present invention contains generally photo-initiator(s) for polymerization.

Any photo-initiator for polymerization may be used that allows radicals or other active species generated by UV light to react with the polymerizable double bonds in said monomer and oligomer. As initiators, benzoin ethyl ether, 2-hydroxy-2-methyl- 1-phenylpropane- 1-one, 1-hydroxycyclohexylphenylketone, 2-methyl- 1-(4-methylthio)-phenyl)-2-morpholinopropanone- 1, and bis-acylphosphine oxide can be used singly, or can be used in combination of these compounds. These compounds are listed there to exemplify, not to limit.

Photo-Initiators for polymerization which were exemplified in #1 Kato, "UV curable system (in Japanese)", Sogo Gijutsu Center Co., Ltd., Feb. 28, 1989, can also be used. Although the amount of the photo-initiators for polymerization are not limited, 1–10% by weight is used in general, 2–5% by weight preferably.

As other additives, antifoam agents and leveling agents are added when necessary.

The liquid composition of the present invention can be pigmented with coloring matter such as organic pigments, inorganic pigments, and dyes, and also functions can be given by adding functional materials such as phosphorescent pigments, photochromic material, thermochromic material, and black light fluorescent material.

Methods for printing or coating easy detachable adhesive agent according to claim 6 include screen printing, off-set printing, gravure printing, flexography, typography, roll coating, and spray coating. Among these, the screen printing is most suited because it can make the thickness of a film of easy detachable adhesive agent thick.

Although patterns of printing or coating of said easy detachable adhesive agent include full coating, lines, dots, and other designs, the area of printed or coated easy detachable adhesive agent on a easy detachable adhesive product should be 10% or larger, preferably 20% or larger.

Preferable thickness of the film of said printed or coated easy detachable adhesive agent is 4 µm or thicker, more preferably 10 µm or thicker in view of stability in easy detachable adhesiveness and durability against washing.

Substrates on which easy detachable adhesive agent is printed or coated include polycarbonate, polyvinylchloride, polyester, polypropylene, polyethylene, acrylic resin, and synthetic paper in general. Forms of the material include the sheet, the film, and the board. Materials which were printed with ink are also included. Substrates which can be printed or coated are acceptable.

Adhesive products can be produced efficiently according to the present invention because a solvent-vaporizing process is not necessary. In addition, the present invention allows repeated use of the adhesive products, which can contribute to resource-saving.

DESCRIPTION OF THE PREFERRED EMBODIMENT

Easy Detachable Adhesive Composition of Embodiment 1:

| Oligourethane diacrylate | 35.0 wt % |
| Compound II (formula 2) | 59.0 wt % |

[Formula 2]

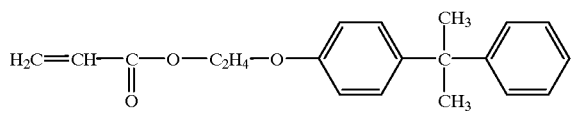

| Acetophenone-derived photo-initiator for polymerization | 5.0 wt % |
| Additive | 1.0 wt % |

After the easy detachable adhesive agent was screen-printed in a at a thickness of 15, μm on 50% area of polycarbonate film with a thickness of 0.3 mm, the agent was exposed to UJV light.

Easy Detachable Adhesive Composition of Embodiment 2:

The same composition as the embodiment 1 was used except that the formula 2 was replaced with the formula 3.

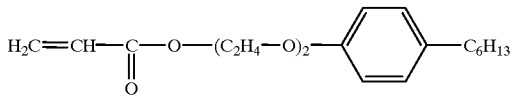

Control (Conventional solvent-soluble easy detachable adhesive composition):

| Rosin-derived resin | 30.3 wt % |
| Petroleum-derived solvent | 58.0 wt % |
| Additive | 2.0 wt % |
| Silicic pigment | 10.0 wt % |

The easy detachable adhesive agent was screen-printed at a thickness of 15 μm on 50% area of polycarbonate film with a thickness of 0.3 mm.

The above products were compared with respect to detachable time of the product against a glass plate, detachable time of the product against a glass plate after washing with a kitchen detergent "Mama Lemon", and detachable time of the product against a glass plate after washing with 99.5% denatured alcohol. The result of the comparison is shown in Table 1.

TABLE 1

| | Embodiment 1 | Embodiment 2 | Control 1 |
|---|---|---|---|
| Detachable time of the product against a glass plate | ≧10,000 | ≧10,000 | 7,500 |
| Detachable time of the product against a glass plate after washing with a kitchen detergent | ≧10,000 | ≧10,000 | ≦50 |
| Detachable time of the product against a glass plate after washing with 99.5% denatured alcohol | ≧10,000 | ≧10,000 | Not detachable |

Detachable times of the products from compositions A, B, and C against a glass plate were ≧10,000, ≧10,000, and 7,500, respectively. Detachable times of the products from compositions A, B, and C against a glass plate after washing with a kitchen detergent were ≧10,000, ≧10,000, and ≦50, respectively. Detachable times of the products from compositions A, B, and C against a glass plate after washing with 99.5% denatured alcohol were ≧10,000, ≧10,000, and 0, respectively (see Table 1). It was shown that the product from composition A or B is more excellent in detachable time after washing with a kitchen detergent or alcohol than that of component C (control).

What is claimed is:

1. An adhesive and detachable product obtained by exposing a liquid composition that was printed or coated on at least on side of a non-adhesive sheet- or board- substrate to UV light to cure said composition to form a solid, wherein the solid is repeatedly adhesive and detachable, and which contains a mono-functional monomer having formula:

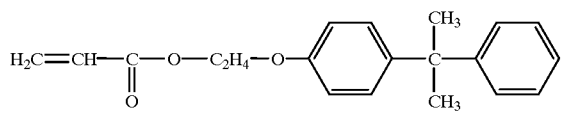

and oligourethane acrylate as the main components.

2. An adhesive and detachable product obtained by exposing a liquid composition that was printed or coated on at least one side of a non-adhesive sheet- or board- substrate to UV light to cure said composition to form a solid, wherein the solid is repeatedly adhesive and detachable, and which contains a mono-functional monomer having formula:

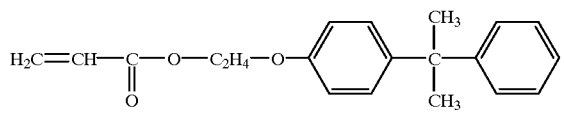

and oligourethane acrylate as the main components, wherein said oligourethane acylate is oligourethane diacrylate.

3. An adhesive and detachable product obtained by exposing a liquid composition that was printed or coated on at least one side of a non-adhesive sheet- or board- substrate to UV light to cure said composition to form a solid, wherein the solid is repeatedly adhesive and detachable, and which contains a mono-functional monomer having formula:

and oligourethane acrylate as the main components, wherein said oligourethane acrylate is oligourethane diacrylate.

4. An adhesive and detachable product obtained by exposing a liquid composition that was printed or coated on at least one side of a non-adhesive sheet- or board- substrate to UV light to cure said composition to form a solid, wherein the solid is repeatedly adhesive and detachable, and which contains a mono-functional monomer having formula:

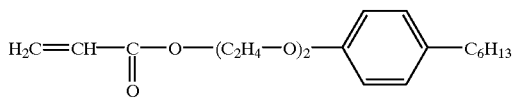

and oligourethane acrylate as the main components, wherein the mono-functional monomer/oligourethane acrylate ratio is 100/35 to 100/75 by weight.

5. An adhesive and detachable product obtained by exposing a liquid composition that was printed or coated on at least one side of a non-adhesive sheet- or board- substrate to UV light to cure said composition to form a solid, wherein the solid is repeatedly adhesive and detachable, and which contains a mono-functional monomer having formula:

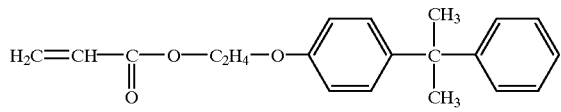

and oligourethane acrylate as the main components, wherein the mono-functional monomer/oligourethane acrylate ratio is 100/35 to 100/75 by weight.

6. An adhesive and detachable product obtained by exposing a liquid composition that was printed or coated on at least one side of a non-adhesive sheet- or board- substrate to UV light to cure said composition to form a solid, wherein the solid is repeatedly adhesive and detachable, and which contains a mono-functional monomer having formula:

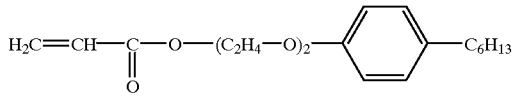

and oligourethane acrylate as the main components, wherein said oligourethane acrylate is oligourethane diacrylate, and the mono-functional monomer/oligourethane acrylate ratio is 100/35 to 100/75 by weight.

7. An adhesive and detachable product obtained by exposing a liquid composition that was printed or coated on at least one side of a non-adhesive sheet- or board- substrate to UV light to cure said composition to form a solid, wherein the solid is repeatedly adhesive and detachable, and which contains a mono-functional monomer having formula:

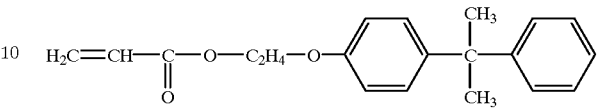

and oligourethane acrylate as the main components, wherein said oligourethane acrylate is oligourethane diacrylate, and the mono-functional monomer/oligourethane acrylate ratio is 100/35 to 100/75 by weight.

8. A liquid composition that can be cured by exposure to UV light, wherein the solid that is formed as a result of the curing is repeatedly adhesive and detachable, and which contains a mono-functional monomer having formula 1 and oligourethane acrylate as the main components, wherein formula 1 is:

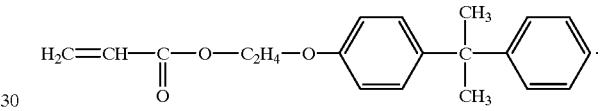

9. A. The liquid composition according to claim 8, wherein the oligourethane acrylate is oligourethane diacrylate.

10. The liquid composition according to claim 8, wherein the mono-functional monomer/oligourethane acrylate ratio is 100/35 to 100/75 by weight.

* * * * *

UNITED STATES PATENT AND TRADEMARK OFFICE
CERTIFICATE OF CORRECTION

PATENT NO. : 6,214,900 B1
DATED : April 10, 2001
INVENTOR(S) : Naoto Takuda

It is certified that error appears in the above-identified patent and that said Letters Patent is hereby corrected as shown below:

Column 3,
Line 17, "printed in a at" should read -- printed at --;
Line 20, "exposed to UJV light." should read -- exposed to UV light --.

Column 4,
Line 16, "least on side" should read -- least one side --.

Column 6,
Line 33, "A. The liquid" should read -- The liquid --;
Line 34, "acrylate is" should read -- acrylate product is --.

Signed and Sealed this

Eighth Day of January, 2002

Attest:

JAMES E. ROGAN
Attesting Officer     Director of the United States Patent and Trademark Office